United States Patent
Beutler et al.

(10) Patent No.: US 6,188,199 B1
(45) Date of Patent: Feb. 13, 2001

(54) BATTERY CHARGE OPTIMIZING SYSTEM

(75) Inventors: Jon Beutler, Camano Island; Jeff Green, Lake Stevens; Qihong Huang, Mukilteo; Philip Questad; Mark Resler, both of Kirkland, all of WA (US)

(73) Assignee: Eldec Corporation, Lynnwood, WA (US)

( * ) Notice: Under 35 U.S.C. 154(b), the term of this patent shall be extended for 0 days.

(21) Appl. No.: 09/540,108

(22) Filed: Mar. 31, 2000

(51) Int. Cl.[7] .................................................. H01M 10/46
(52) U.S. Cl. .............................................................. 320/125
(58) Field of Search ................................... 320/124, 125, 320/132, 137, 160

(56) References Cited

U.S. PATENT DOCUMENTS

| | | |
|---|---|---|
| 3,703,675 | 11/1972 | Alric et al. . |
| 4,061,956 | 12/1977 | Brown et al. . |
| 4,146,830 | 3/1979 | Foster . |
| 4,380,725 | 4/1983 | Sherman . |
| 4,443,752 | 4/1984 | Newman . |
| 4,536,696 | 8/1985 | Ray . |
| 4,649,333 | 3/1987 | Moore . |
| 5,250,891 | 10/1993 | Glasgow . |
| 5,623,197 | 4/1997 | Roseman et al. . |
| 5,864,221 | 1/1999 | Downs et al. . |
| 5,969,436 | 10/1999 | Chalasani et al. . |

OTHER PUBLICATIONS

Reid, D.P. and Glasa, I., "A New Concept: Intermittent Charging of Lead Acid Batteries in Telecommunication Systems," International Telecommunications Energy Conference, Nov. 1984, pp. 67–71.

*Primary Examiner*—Edward H. Tso
(74) *Attorney, Agent, or Firm*—Christensen O'Connor Johnson Kindness PLLC

(57) ABSTRACT

An optimizer circuit is interposed between a DC bus and a battery of a power supply system, including two converters in parallel, one that can lower the battery voltage below the bus voltage or directly connect the bus to the battery and one that can raise the voltage to the battery above the bus voltage. A controller actuates the two converters for optimizing battery charging and maintenance and for providing the battery power to the bus if other sources supplying the bus are not available.

4 Claims, 6 Drawing Sheets

BATTERY CHARGE OPTIMIZING SYSTEM

FIELD OF THE INVENTION

The present invention relates to batteries connected to direct current (DC) buses and, more specifically, to a charge optimizer interposed between the battery and the bus.

BACKGROUND OF THE INVENTION

In some applications, such as aircraft applications, batteries are used as a power source for engine starting or as an emergency power source for a DC bus. Obviously, it is important to maintain the battery in a fully charged condition and to charge it after use. In known systems, a DC bus to which the battery is connected may itself be powered by a DC source, such as an engine-driven AC generator and a transformer rectifier unit (TRU) to convert AC to DC. During normal operation, the DC power source provides power for electrical loads of the system, in addition to providing power for charging the battery. If the DC power is interrupted, the battery immediately provides power to the DC bus. In order to reduce the voltage variation on the DC bus, the battery nominal voltage is usually selected to be close to the DC bus voltage.

The battery system with these components is simple and low cost so it is widely used in aircraft, electrical vehicle, and telecommunications applications. However, in this configuration, the battery is maintained in a float mode where the battery is fully charged and is essentially being topped off continuously because the DC power feeding the bus almost always is available. Therefore, the battery may be overcharged for long periods of time, resulting in battery overheating and electrolyte loss. On the other hand, if the bus voltage is too low the battery could be undercharged, resulting in capacity fade. In both cases this results in reducing system reliability, as well as increasing battery system maintenance cost. In addition, it may be undesirable to keep a completely discharged battery floating on the bus because the battery may draw a large transient current during initial charging and overloading the DC source.

One approach to these problems is to regulate the DC bus voltage in a way that is better for charging the battery. For example, the DC bus voltage may be initially reduced following battery discharge to prevent large current in-rush transients. The voltage may then be raised above a normal charging level to increase the battery charging rate. Such systems provide better control over battery charging to prevent overheating of the battery, and allow the battery to be recharged more quickly. However, there is substantial increased cost and complexity in regulating the DC bus voltage, and other aircraft systems connected to the bus may be affected.

More often, the DC bus is powered with an unregulated source, such as a TRU. In these systems, attempts have been made to intermittently connect the battery to the bus, as described, for example, in U.S. Pat. No. 3,703,675, which uses a contactor to control the battery charge and a parallel diode to provide a discharge path, and U.S. Pat. No. 5,969,436, which uses a MOSFET in series with a diode in order to control battery discharging. Another approach has been to add a "boost" circuit in series with an intermittently charged battery, to provide a voltage higher than the DC bus voltage for battery charging. See, for example, U.S. Pat. No. 4,061,956. Also, U.S. Pat. No. 4,443,752 describes a similar technique using a MOSFET as a switch. In either of these systems, two series-connected power components are provided on the high current path between the DC bus and the battery, which may increase power dissipation during operation.

SUMMARY OF THE INVENTION

The present invention provides a high efficiency system for battery charging off a DC bus, at low cost and adaptable to changing conditions of the battery. In the preferred embodiment, two converters in parallel are used, one that can lower the battery voltage below the bus voltage or directly connect the bus to the battery and one that can raise the voltage to the battery above the bus voltage. The preferred system also optimizes battery charging by maintaining battery capacity, reduces water loss, and allows increased maintenance intervals.

The first converter operates bi-directionally. It can perform as a simple contactor or as a voltage regulator with current limit. The primary function of this converter is to provide a path for battery "bulk" charge, i.e., the major portion of the charging, or for the battery to hold the bus voltage when the usual DC source is interrupted.

The second converter, in parallel with the first converter, provides an elevated voltage for battery topping and trickle charging. Since the current for these charges is small, the second converter is designed only to handle low power operation. This reduces the cost and improves the efficiency, while achieving the optimal control of battery charging.

In the preferred embodiment, a battery charge optimizer (BCO) in accordance with the present invention has two buck converters, one operating from a voltage higher than the DC bus.

The system in accordance with the present invention operates in three modes. For a discharged battery, the charge starts at a current limited "bulk mode" in which the charging current is controlled. When a desired charging state is reached, detected by the decreasing charging current, a "topping mode" is used where a predetermined current level is maintained but the battery voltage is free to rise. When the rising voltage reaches a temperature compensated set point, the charge is transacted to a second stage of topping mode where the voltage is maintained for a relatively short period. Thereafter, a third mode, "trickle mode" or "balance mode", is effected in which the charging current is maintained at a small value.

In a representative aircraft application, the BCO in accordance with the present invention is interposed between the DC bus and the battery, but the battery still can be directly connected to a potential load, such as the starter of an auxiliary power unit (APU).

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
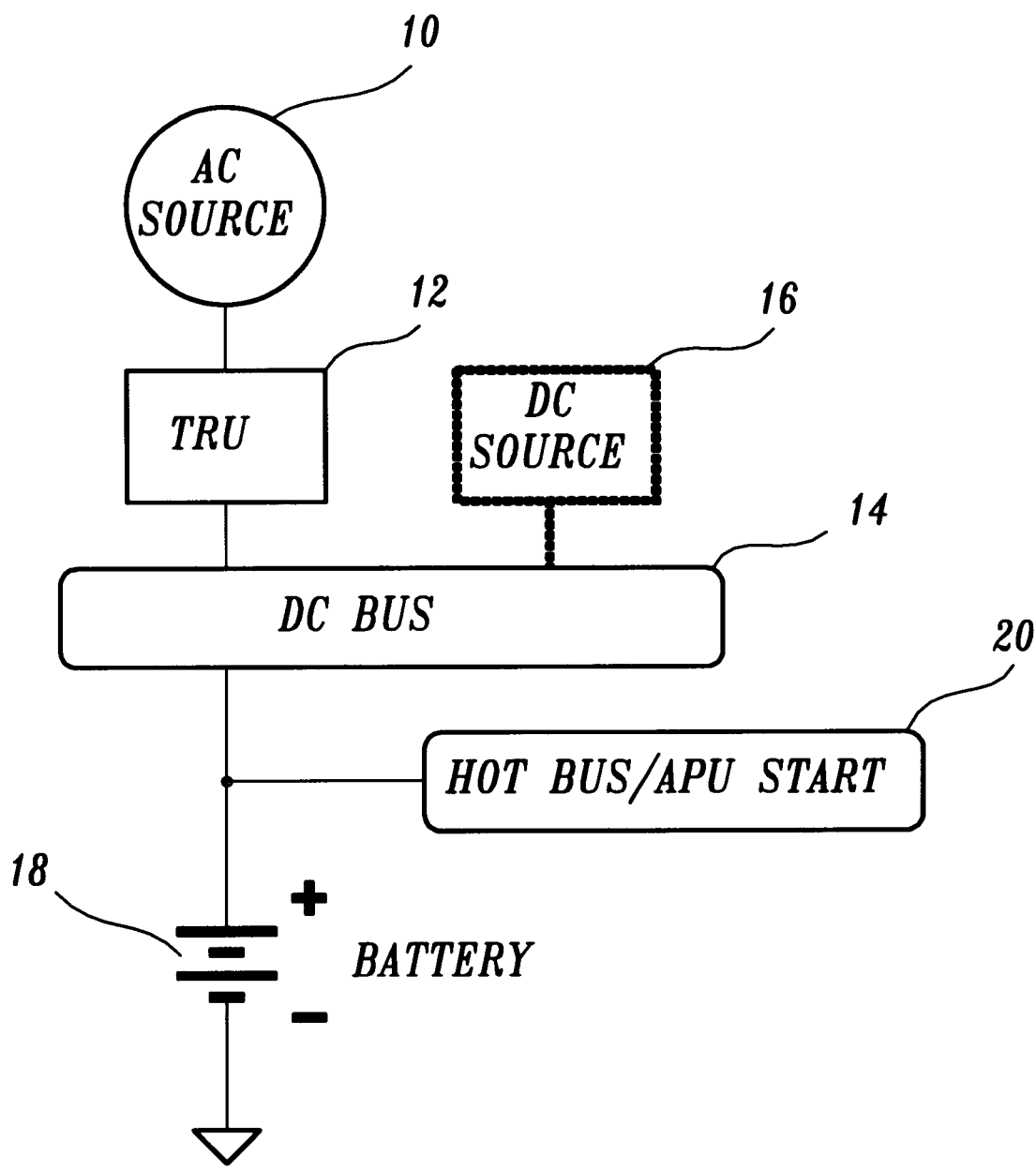
FIG. 1 (prior art) is a block diagram of a known power supply system using a DC bus in combination with a battery.

The present invention can be used in a system having a DC bus supplying power to one or more components of a system, such as in an aircraft. A known system is illustrated diagrammatically in FIG. 1. A three-phase generator 10 driven by an aircraft engine supplies an AC output to a transformer rectifier unit (TRU) 12. The TRU supplies a nominal voltage to the DC bus 14, such as 28 volts. Other sources may supply power to the bus, such as a ground power source 16, when the aircraft is parked and the engines are not running.

In such a system a battery 18 will supply power to the bus if the other power sources are not available. The battery also may supply larger loads, represented by box 20, such as the starter of an auxiliary power unit (APU). In such an arrangement, the larger load may be connected directly to the battery output, i.e., without being supplied by way of the bus 14.

In the system of FIG. 1, battery charging is by way of the floating bus voltage. If the battery is completely discharged, a larger than optimal current may be supplied. If the DC bus voltage is too low then the battery may be undercharged and experience battery fade. Similarly, a fully charged battery will still receive the bus voltage and may overheat and/or experience increased water loss, or the battery may be otherwise damaged or have its useful life lessened.

Figure 2:
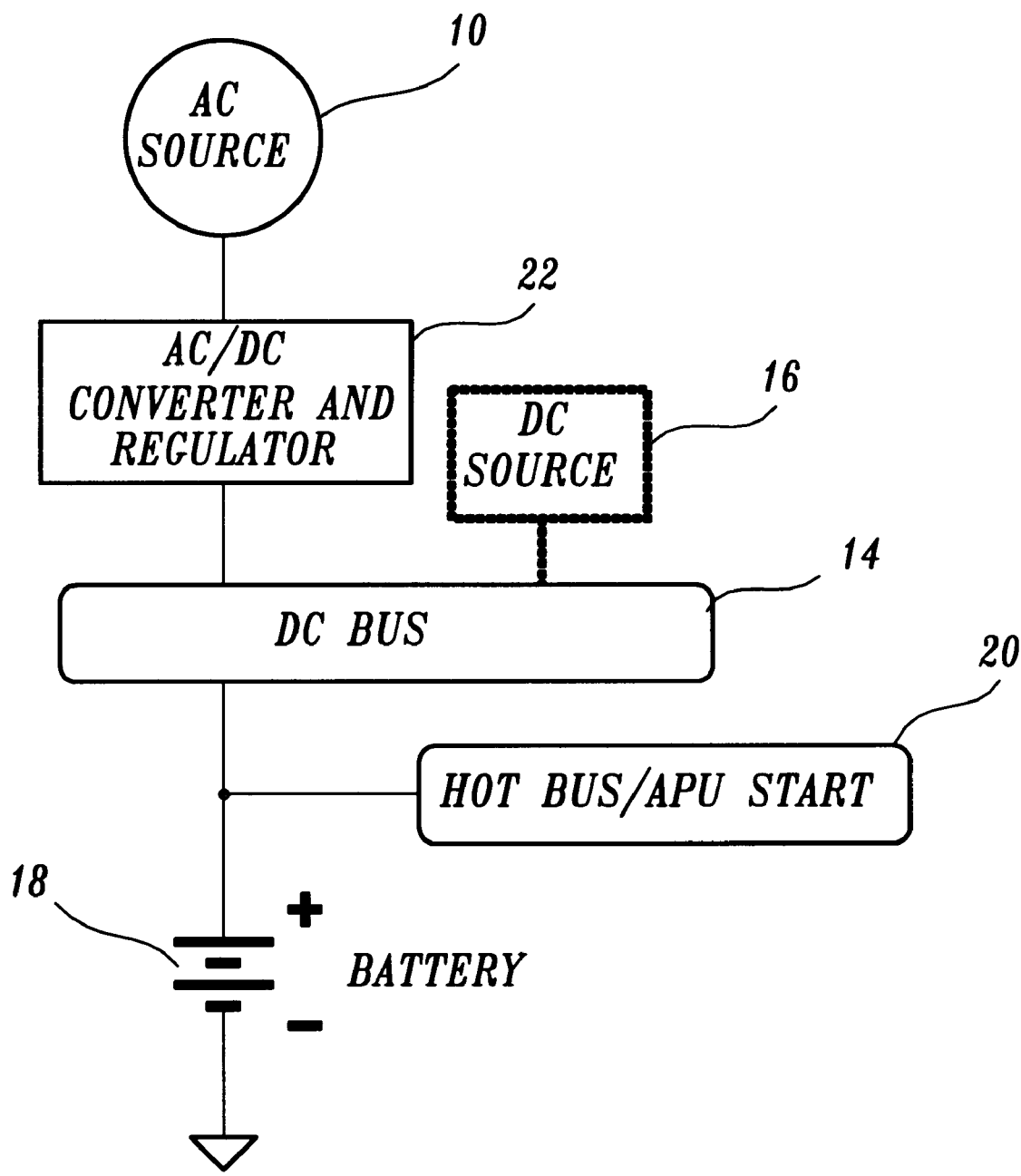
FIG. 2 (prior art) is a block diagram of a second known power supply system using a DC bus in combination with a battery.

One approach to solving the battery charging problems of the system of FIG. 1 is illustrated in FIG. 2. In such a system, a regulated power source 22 supplies power to the DC bus 14 based, at least in part, on the condition and state of the battery 18. In such a system, the bus voltage may be raised or lowered, which can affect other components connected to the bus, and which, in general, is expensive.

Figure 3:
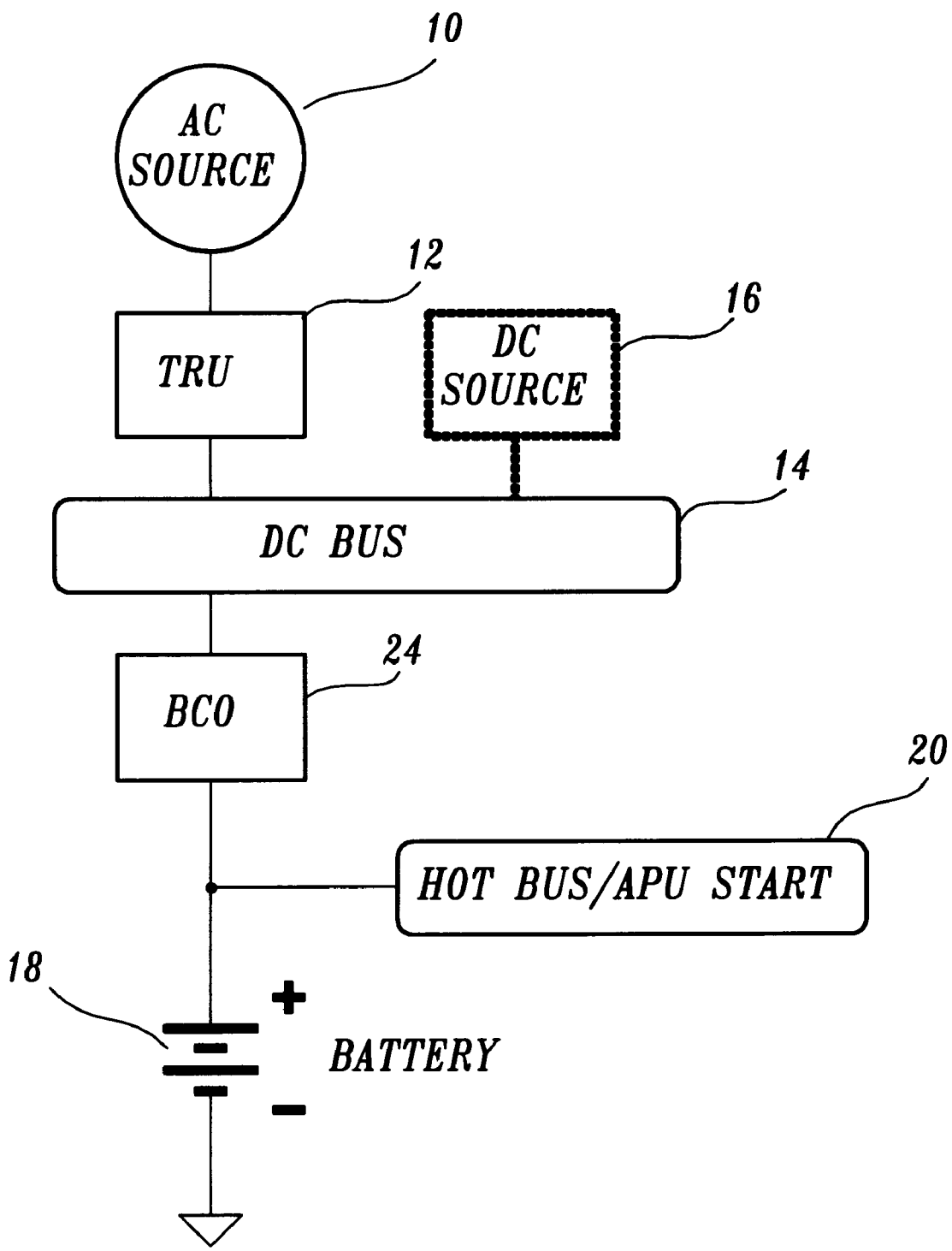
FIG. 3 is a block diagram of a battery charge optimizing system in accordance with the present invention.

FIG. 3 is a block diagram of a representative application of an optimizing system in accordance with the present invention. As represented toward the top of the Figure, the supply of power to the DC bus 14 is conventional, coming from an AC source 10, such as a generator driven by an aircraft engine, through a TRU 12, or by way of an alternative DC source 16, such as a ground power source. A battery charge optimizer (BCO) 24 is interposed between the bus 14 and the battery 18. The potential high load 20 for the battery (labeled "hot bus/APU start" in FIG. 3) can be connected directly to the battery, i.e., at the opposite side of the BCO 24 from the DC bus 14. In addition, the BCO is bi-directional such that the battery may supply power to the DC bus if the potential sources represented at the top of FIG. 3 fail and/or are disconnected.

Figure 4:
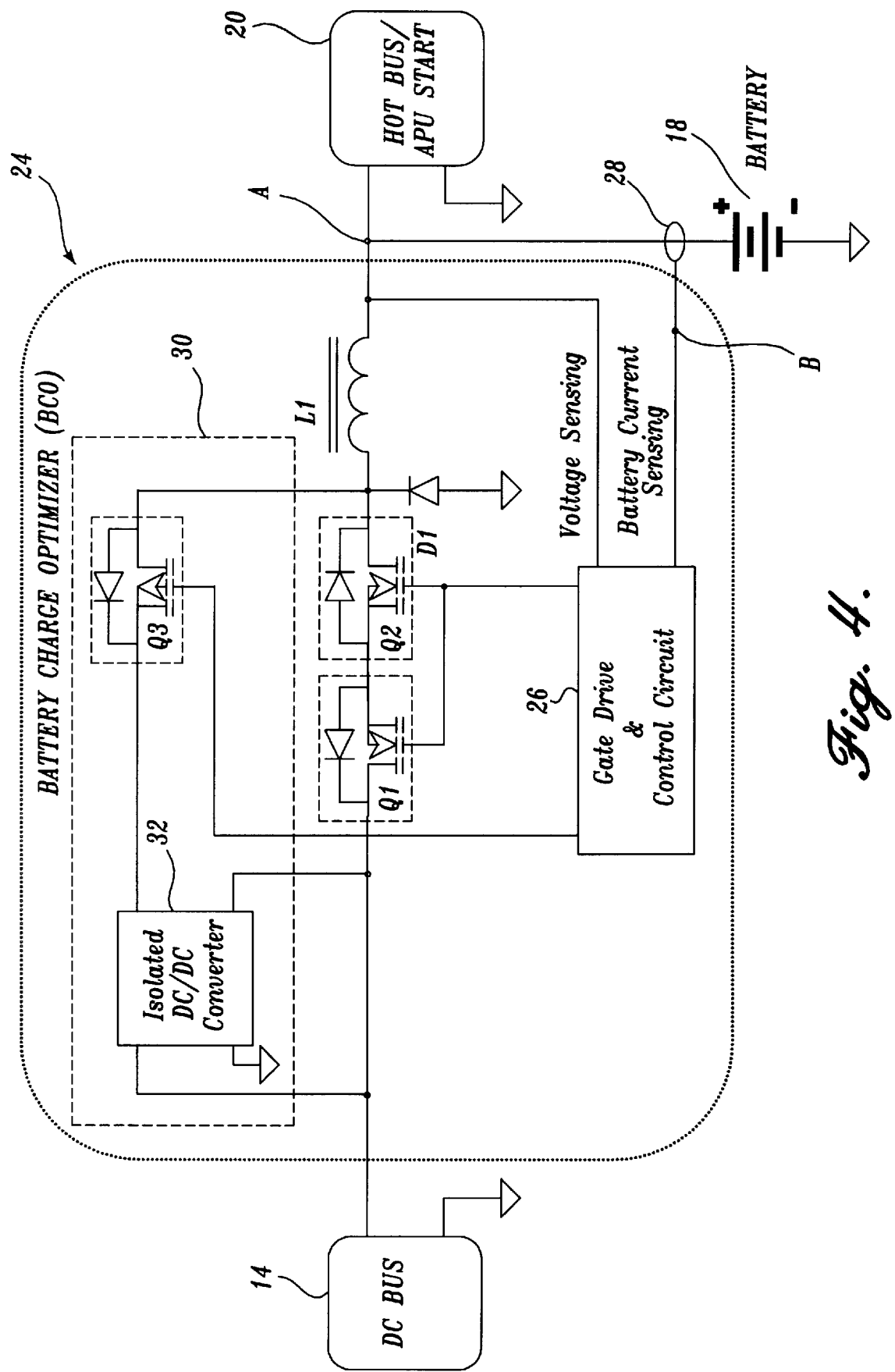
FIG. 4 is a more detailed diagram of a component of the system of FIG. 3.

FIG. 4 is a block diagram of the BCO unit 24, with the DC bus 14 at the left and the potential high load 20 at the right. In general, a gate drive and control circuit 26 senses the voltage at the output terminal of the battery 18 (such as at point A of FIG. 4) and a conventional current sensor 28 detects the current flowing to the battery (such as a Hall current sensor which provides a varying voltage output depending on the sensed current). The gate drive and control circuit 26 provides a switching signal to a pair of MOSFETs Q1 and Q2 in anti-series or to a MOSFET Q3 of a voltage boost DC/DC converter circuit 30.

More specifically, under the desired parameters, such as those described in more detail below, the gate drive and control circuit 26 will activate MOSFETs Q1 and Q2, in which case the DC bus 14 is connected directly to the battery 18 through a smoothing inductor L1. Alternatively, the gate drive and control circuit 26 can actuate MOSFET Q3 which results in adding the voltage of a DC/DC converter 32 to the voltage of the DC bus 13, i.e., the voltage to the battery is boosted for optimal charging under certain conditions as described below.

Figure 5:
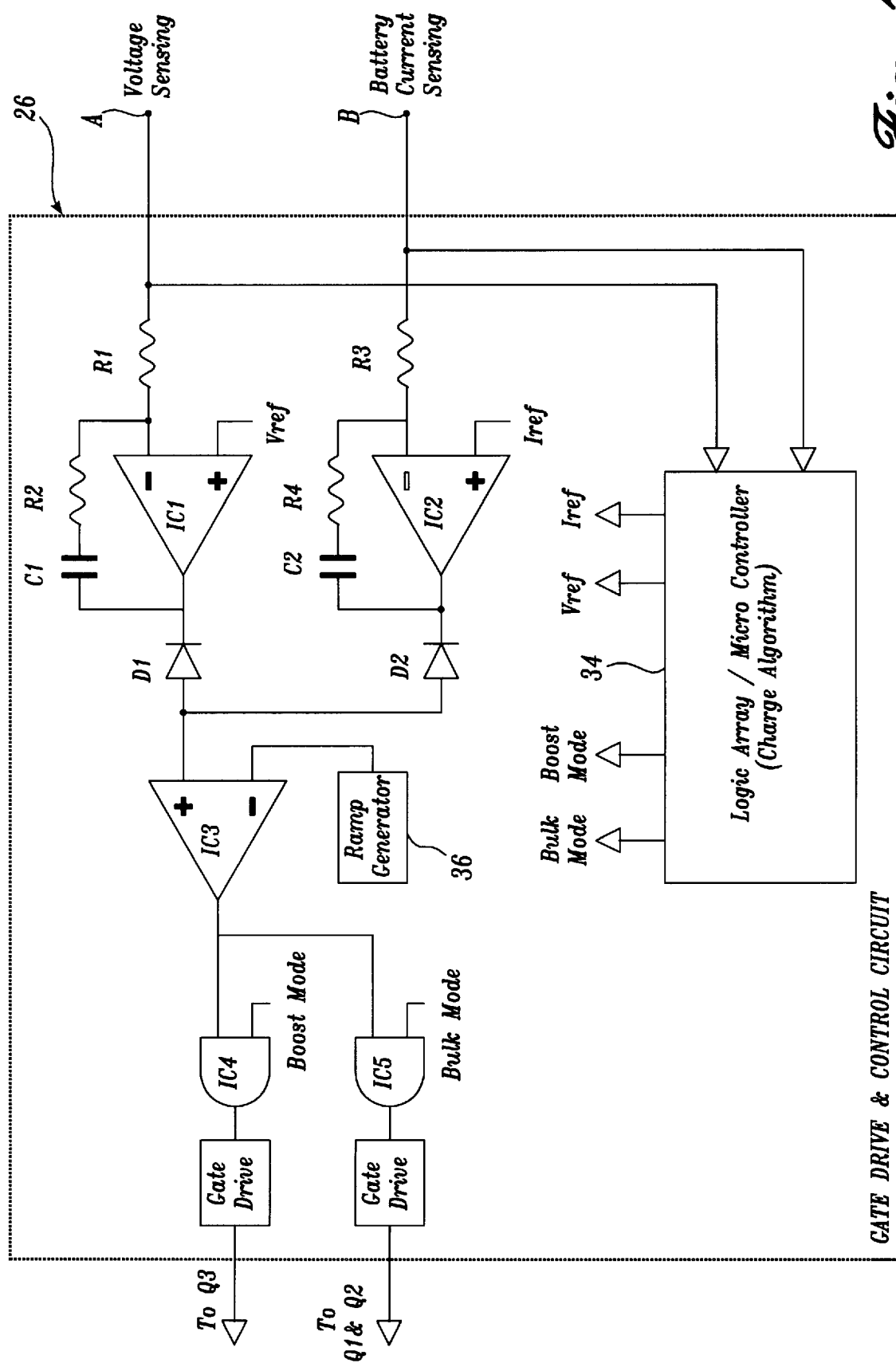
FIG. 5 is a more detailed block diagram of a component of the system in accordance with the present invention as represented in FIG. 4.

A schematic of the gate drive and control circuit 26 is illustrated in FIG. 5. The battery current sensing signal and voltage sensing signal (points A and B in FIG. 4 and FIG. 5) are supplied to a logic array or microcontroller 34. The current sensing signal is supplied as one input to an operational amplifier IC2 having negative feedback. The other input is a reference voltage labeled $I_{ref}$ in FIG. 5 because such voltage is indicative of a desired current. The voltage sensing signal is supplied to another operational amplifier IC1 having negative feedback, with a voltage reference input $V_{ref}$ from the logic array/microcontroller. The outputs of these two amplifiers are supplied to a comparator IC3, having a voltage from a ramp generator 36 as its other input. The output of the comparator IC3 is supplied to a pair of AND gates IC4 and IC5, one of which receives a boost mode signal (high or low; on or off) from the logic array/microcontroller 34 and the other of which receives a bulk mode signal (high or low; on or off) from the logic array/microcontroller.

Figure 6:
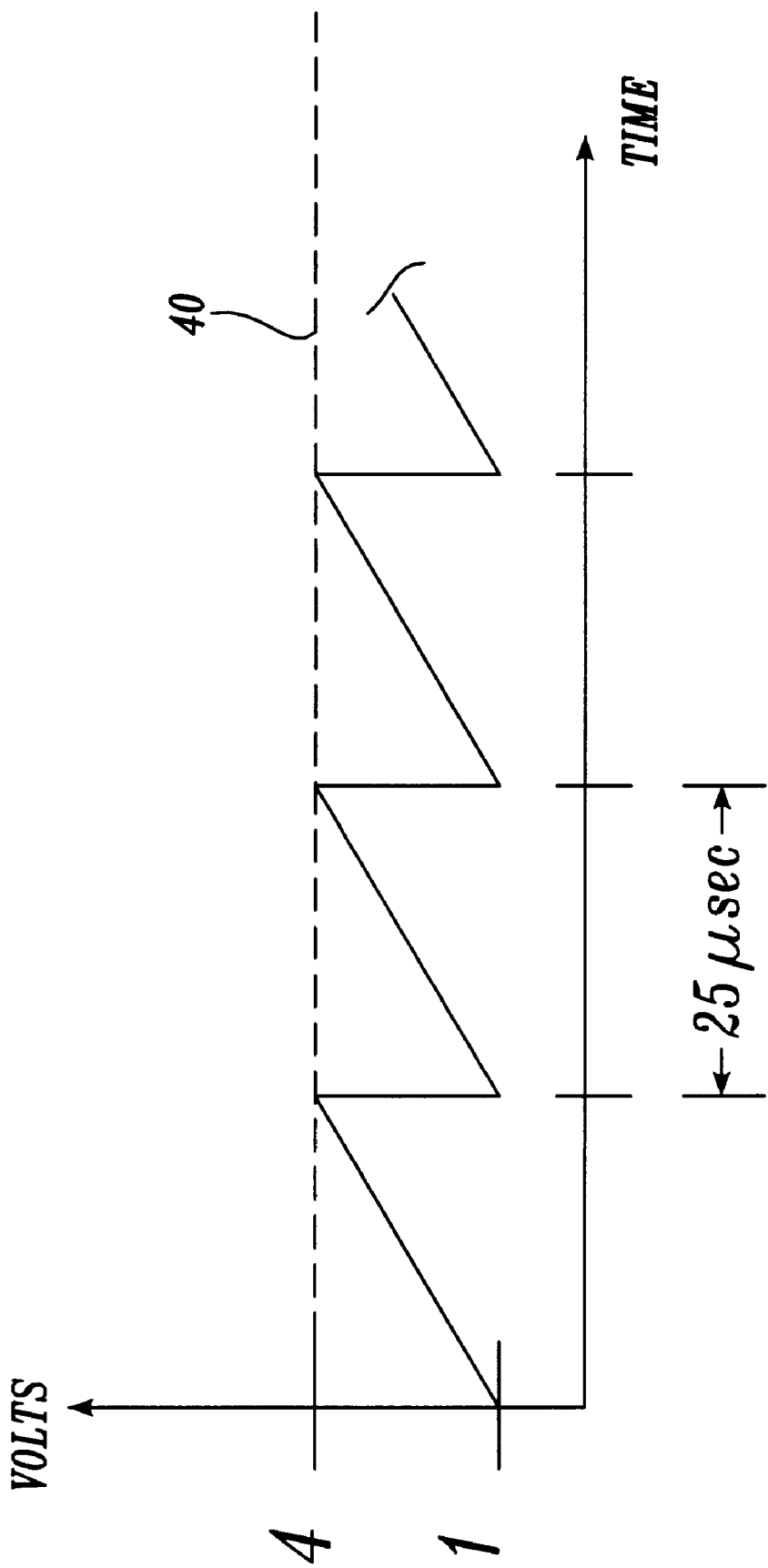
FIG. 6 is a graph illustrating operation of part of the system of FIG. 5.

Operation can best be described with respect to a representative embodiment, although it should be understood that other operational parameters may be chosen depending on the particular application. For an aircraft having a 28-volt nominal DC bus supplied by an unregulated DC source such as a TRU, a 24-volt nominal battery may be used. A Hall current sensor having an output of about 0.8 volt per 10 amps detected current can be used. The error amplifier circuits IC1 and IC2 have sufficient gain to maintain $V_{ref}$ equal to point A and $I_{ref}$ equal to point B. The ramp generator 36 can have an output as represented in FIG. 6, a repeating essentially linear ramp of a frequency of 40 KHz (25 $\mu$ seconds duration) ranging from one to four volts.

Starting from a situation in which the battery is fully discharged, the low voltage of the discharged battery is sensed at point A and supplied as an input to the logic array/microcontroller 34. The logic array/microcontroller supplies a "high" signal to turn on the bulk mode MOSFETs Q1 and Q2, which actuates a closed circuit condition of this part of the BCO as compared to an open circuit condition if Q1 and Q2 are off. The DC bus voltage is applied at the positive input of the battery, through Q1 and Q2 and inductor L1. A current limit can be supplied by way of $I_{ref}$. In a representative embodiment, $I_{ref}$ may be 6.4 volts which corresponds to a maximum charging current of 80 amps. More specifically, referring to FIGS. 5 and 6, the system is tuned such that if the battery current sensing signal at the negative input of amplifier IC2 rises to a level indicating 80 amps charging current, the signal supplied to the positive input of comparator IC3 is approximately four volts. The voltage of the signal supplied by the ramp generator to the negative input of the comparator is less than the voltage of the signal from amplifier IC2 for the entire duty cycle of the ramp. Consequently, a constant high output from the comparator is supplied to the AND gate IC5 which also is receiving a high "bulk mode" input from the logic array/microcontroller. The logic array/microcontroller supplies a low "boost mode" input to AND gate IC4. The result is that MOSFETs Q1 and Q2 are turned on. So long as the sensed current is below 80 amps, the output of amplifier IC2 will be greater than the maximum value of each ramp. If, however, the sensed current exceeds 80 amps, the output of amplifier IC2 is lessened to a point where it intersects the upper portion of each ramp. In that case, the bulk mode AND gate ICS will intermittently turn off MOSFETs Q1 and Q2, and the turnoff time will increase for increasing sensed current. The system is brought back into balance by an effective maximum charging current of 80 amps.

This "bulk mode" charging state with the bus connected to the battery continues until the battery charging current falls to a predetermined value, 10 amps in the representative application. At this stage, $I_{ref}$ is set at 0.8 volts by the logic array/microcontroller 34, corresponding to 10 amps charging current, and the boost mode is activated, i.e., the bulk mode signal to AND gate IC5 goes low and the boost mode signal goes high to AND gate IC4, which actuates the boost circuit to a closed circuit condition between the bus and the battery from an open current condition. An increased voltage is provided by way of the boost circuit 30 (FIG. 4) consisting of the isolated DC/DC 32 converter and MOSFET Q3. The ramp generator works in conjunction with amplifier IC2 as described above, but with the lower reference voltage at the positive input so that a constant current of 10 amps is maintained. The 10 amp charging is continued until the voltage at point A reaches 30 volts, and for a predetermined period thereafter, one-half hour in the representative embodiment.

Then, the system switches to the "balance mode" which also can be referred to as "trickle mode" where a very small current is maintained by setting $I_{ref}$. In the representative embodiment the charging current would be 0.1 amp to 0.5 amp during the balance mode, which is achieved by setting the $I_{ref}$ value at a corresponding low voltage, and the boost circuit MOSFET Q3 remains on with MOSFETS Q1 and Q2 off.

In summary, bulk mode is activated for voltages at point A (battery voltage) less than the DC bus voltage and a detected charging current of 10 amps to 80 amps. No more than 80 amps can be supplied. This mode is also actuated if power to the bus is lost. The BCO switches to boost mode when the charging amperage falls to 10 amps. Boost mode continues by supplying a 10 amp constant current until the voltage at point A is 30 volts, and for the predetermined period thereafter, whereupon the circuit switches to balance mode for supplying the very low trickle current, such as 0.1 amp to 0.5 amp.

In the case of a main power source failure, bulk mode (Q1 and Q2 on) results in powering the bus by way of the battery.

For efficient operation of the large load 20, the power connection can be directly to the battery output terminal. A simple and cost effective power supply can be used for the bus, with optimal charging and maintenance for the battery.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a power supply system having a DC bus and a battery connected to the bus, an optimizer connected between the bus and the battery, said optimizer comprising:

a first circuit connected in series between the bus and the battery and actuatable between an open circuit condition and a closed circuit condition, the first circuit in the closed circuit condition interconnecting the bus and the battery bi-directionally for supplying charging current to the battery from the bus or power from the battery to the bus depending on the relative voltages of the bus and the battery;

a second circuit connected in series between the bus and the battery, in parallel with the first circuit, and actuatable between an open circuit condition and a closed circuit condition, the second circuit in the closed circuit condition providing a voltage higher than the voltage of the bus to the battery; and a controller sensing the voltage of the battery and sensing current flowing to the battery and actuating the first and second circuits as a function of the sensed voltage and current.

2. In the power supply system defined in claim 1, the controller actuating only the first circuit and not the second circuit when the sensed voltage is below a predetermined amount and the sensed current is in a predetermined range.

3. In the power supply system defined in claim 2, the controller actuating only the second circuit and not the first circuit when the sensed current is below a predetermined current.

4. In the power supply defined in claim 3, the controller intermittently actuating one of the first and second circuits when the sensed voltage is above a predetermined voltage for maintaining a small trickle current from the bus to the battery.

\* \* \* \* \*